United States Patent [19]
Thering

[11] Patent Number: 5,724,839
[45] Date of Patent: Mar. 10, 1998

[54] VEHICLE LOCKING MEANS WITH WHEEL CLAMPS

[76] Inventor: Gary A. Thering, 11079 Millers Rd., Lyndonville, N.Y. 14098

[21] Appl. No.: 846,834

[22] Filed: May 1, 1997

[51] Int. Cl.⁶ .................................................. B60R 25/00
[52] U.S. Cl. .................... 70/18; 70/19; 70/226; 70/238
[58] Field of Search .................... 70/225–228, 237–239, 70/18, 19

[56] References Cited

U.S. PATENT DOCUMENTS

| | | | |
|---|---|---|---|
| 584,017 | 6/1897 | Sewell | 70/226 |
| 1,401,971 | 1/1922 | Faison | 70/15 |
| 1,443,009 | 1/1923 | Davis | 70/227 |
| 1,488,893 | 4/1924 | Plouffe | 70/226 |
| 1,504,220 | 8/1924 | Degen | 70/227 |
| 2,844,954 | 7/1958 | Marugg | 70/225 |
| 3,245,239 | 4/1966 | Zaidener | 70/202 |
| 4,768,359 | 9/1988 | Wade | 70/226 X |
| 4,833,442 | 5/1989 | Von Heck | 70/226 X |
| 5,247,815 | 9/1993 | Caldwell | 70/226 X |
| 5,259,081 | 11/1993 | Henderson | 70/226 X |
| 5,265,449 | 11/1993 | Rashleigh | 70/18 |
| 5,271,636 | 12/1993 | Mohrman et al. | 70/227 X |
| 5,372,018 | 12/1994 | Smith | 70/226 X |
| 5,460,021 | 10/1995 | Taylor | 70/226 X |
| 5,520,034 | 5/1996 | Edmondson | 70/226 |
| 5,628,212 | 5/1997 | Fritzler | 70/226 X |

FOREIGN PATENT DOCUMENTS

| | | | |
|---|---|---|---|
| 506328 | 8/1920 | France | 70/226 |
| 16991 | 7/1909 | United Kingdom | 70/228 |
| 2106058 | 4/1983 | United Kingdom | 70/226 |
| WO86/05150 | 9/1986 | WIPO | 70/226 |

*Primary Examiner*—Lloyd A. Gall
*Attorney, Agent, or Firm*—James J. Ralabate

[57] ABSTRACT

This is a universal vehicle locking device that can be used with solid or open rim wheels of a small multiple wheel structure. It is a feature of this locking device that there are multiple contact points (for example, three) that hold the device in position; two are with the outside of the tire and the third is at the periphery of the rim. There is located on connecting rods a hand movable handle to easily lock the device to the set of wheels of the vehicle.

7 Claims, 6 Drawing Sheets

VEHICLE LOCKING MEANS WITH WHEEL CLAMPS

This invention relates to a locking means for small multiple wheel vehicles and, more specifically, a device for prohibiting the movement of the vehicle.

BACKGROUND OF THE INVENTION

A problem existing today is the theft of four wheel vehicles such as All Terrain Vehicles (ATVs), riding lawn mowers, tractors and other small vehicles. These vehicles are easily moved from the owner's garage or other storage area merely by pushing the vehicles and either loading them on a truck or trailer or by driving them away. Roll-off theft of these vehicles is becoming more and more common, and since the cost of such vehicles is escalating, it would be desirable to have a simple to use, relatively inexpensive system for preventing such theft.

There are known various locking devices to prevent or restrict the movement of small vehicles. Typical of these are the locking mechanisms disclosed in U.S. Pat. Nos. 584,017; 1,401,971; 1,488,893; 3,245,239; 5,265,449; and 5,271,636. In all of these patents' locking means, a hook goes through the spokes and extends around to the other side of the wheel. In U.S. Pat. No. 584,017 a bicycle lock is disclosed where a two part bar with ratchet teeth is fit on one end into a casing with a key hole. The other end of these bars has a hook structure that fits around spokes to the opposite side of the wheel. Once in place, the bars are fitted to the proper length and locked into position via key hole 19. Hooks 22 of U.S. Pat. No. 584,017 fit around the rim of the wheels. Sewell uses two locking bars and a lock box to secure a bicycle and similar vehicles and is designed to secure two wheels, one in front of the other. The locking bars encircle the rims of bicycle through the spoke area. The lock box is in the middle and accepts the locking bars, holding them securely until someone unlocks the box.

The present invention could work on bicycles as well as motorcycles, lawn mowers and ATV's and other suitable machines or vehicles. The difference between the locking device of the present invention and that of prior art is that the present invention will work on vehicles with a closed center wheel and wheels that are side by side instead of one in front of the other. The Sewell patent is for bicycles and similar vehicles (lines 10–15). The present invention is mostly designed for machines or pieces of equipment with the wheel structures side by side and of a closed center design. The Sewell device uses the length of the hook to surround the rim and then to be caught up in the spokes of the wheel if a theft is made or attempted by riding off. The Sewell front to back locking means may be useful but may not function properly for other machines or equipment.

In U.S. Pat. No. 1,401,971 (Faison) a lock for automobiles is disclosed whereby a chain is extended from one rear wheel to the other. A band 1 or clamp 1 is looped around the entire rim of the wheel. Once the chain is in place, a padlock locks the chain in place, thereby preventing movement of the auto. As above noted, for this type of lock means to function, there must be a spoked or open wheel hub portion for the band 1 to fit through and encircle the tire or wheel. This invention uses a split ring and chain, both of which encircle the opposite tires and padlocked together where they meet. While this was effective in its time period (1920–1922) it is not effective now because of the change in wheel structure construction. The wheels of autos and early vehicles were of a spoke construction. In this style of wheel the split ring could encircle the tire through the open center. Modern construction of most smaller vehicles uses a solid center wheel or rim, thus making this prior art device unable to be used today. On solid wheel construction, one would have to physically change the wheel by boring a hole in both rims to accommodate the ring and the chain.

Plouffe (U.S. Pat. No. 1,488,893) discloses a vehicle locking device where jaws 13 are fit around the wheels of a vehicle. Each leg or portion 11 of the u-shaped jaws 13 are fit under the tire, through the spokes of the wheel and tightened into position. Here again, the locking device travels around the entire wheel or tire and is somewhat difficult to apply and disengage. This patent uses two locking bars with a lock box in the center and a set of steel jaws at the opposite ends. These jaws when engaged with the wheels encircle the tire and rim moving around the area between two spokes in rim of the wheel. Adjustment of the body-bars in the lock is done by hand by moving the bars until the holes in the bars line up. The jaws that this device uses in its construction encircle the tire and rim in an open wheel construction. This device will not work on a closed wheel or solid rim. The present invention works equally well either on an open or closed wheel construction. Security of the vehicle remains the same. For that matter, a three point contact is used in the present invention making for a more secure locking action. Also, in the present invention, the handle and adjustment rail assembly will hold the rail in place and will enable the user to quickly and easily hook up the lock.

The Zaider patent (U.S. Pat. No. 3,245,239) teaches the use of an anti-theft device for vehicles where the locking mechanism fits around the steering wheel of a car or other vehicle. One end of the telescopic member 110 fits around the car accelerator pedal 131 and the opposite end of member 110 fits around the rim or spoke 132 of the steering wheel. A lock 118 is provided to lock telescopic member 110 in place.

U.S. Pat. No. 5,265,449 teaches the use of a snowmobile locking means where the device 20 fits around the track 24 and is then locked in place. As device 20 moves around the driving mechanism, it reaches a portion 28 of the body which stops the device 20 and thereby stops the movement of the track 24.

In U.S. Pat. No. 5,271,636 an adjustable wheelchair device is disclosed which restricts movement of the chair. The device is secured to the wheels and extends through the spokes around the entire wheel. Upon rotation of the wheels the device will engage the back portion of the chair (or other portions) which then will prevent further movement of the wheels.

In all of the above prior art devices, the locking device used enters the wheel on one side and extends through the spokes around the entire wheel. Upon rotation of the wheels the device will engage the back portion of the chair (or other portions) which then will prevent further movement of the wheels.

In all of the above prior art devices, the locking device used enters the wheel on one side and extends through the wheel rim or spokes to the opposite side of the wheel. These are not useful on wheels with solid rims, i.e., rims without openings to the other side.

SUMMARY OF THE INVENTION

It is therefore an object of this invention to provide a vehicle locking means that is devoid of the above noted disadvantages.

Another object of this invention is to provide a vehicle locking means that can be used with today's small multiple wheel vehicles.

Still a further object of this invention is to provide a locking means that has universal usage with all wheels whether with solid or spoked rims.

Yet another object of this invention is to provide an easy to use, relatively uncomplicated secure locking means for tractors, ATVs and riding lawn mowers.

Another still further object of this invention is to provide an effective means against roll-off theft of these small vehicles with an easy to install braking apparatus.

These and other objects of this invention are accomplished generally speaking by a vehicle locking means having terminal ends that fit into one side of the tire rims and do not extend through the wheel rim or spokes. Thus, this locking means can be universally used on any type wheel whether solid rim or open rim with spokes. A critical feature of this invention is that the end clamps fit only on the outside rim of the wheel and outside surface of the tire. The term "front tire surface" means that outside tire surface closest the rim, and "rear tire surface" means that outside surface farthest from the rim. By "horizontally" is meant a location parallel with the surface of the ground. By "rod" is meant any structure(s) connecting the end clamps. "Universal" means that the locking means of this invention can be used with all wheeled structures with solid or unsolid rims. "Set of wheels" means the rear set or front set of wheels. It is important that the two clamps contact both the rim and the outside tire surface to properly lock the vehicle. The two clamps fit into two different horizontally extendable connected rods or bars that project across the width of the vehicle or wheel base. Once the locking structure is tightly fixed in place on both wheels, the horizontal bar upon wheel rotation will hit a portion of the vehicle and prohibit any further movement of the vehicle. The ends of the clamps preferably have rubber coatings so that the locking action against the rubber tire surface and the metal rim is greatly enhanced. The inner surface of both end clamps preferably have this rubberized surface. Along the length of at least one section or portion of the horizontal bars are located a plurality of apertures that provide adjusting means for various size vehicles. Once the proper expansion or contraction of the two movable horizontal rods is accomplished a movable handle locks the two rods tightly in position. A lock is then applied locking both movable rods together. The locking mechanism is then difficult if not impossible to remove unless unlocked and removed from the vehicle. The universal locking device of this invention will function as noted on either open center (rim) or closed center wheels whereas the prior art units above noted function only on open center wheels. Also the device of this invention can easily be carried on the vehicle and be installed when desired. A handle means makes the device simple to lock in place.

Thus, the present locking means unit uses a clamping action by which the front or rear tires of the intended vehicle are not allowed to make a full revolution with the unit in place and locked. The unit attaches to the front or rear wheels of the vehicle by the way of a handle attached to the female end and a rod attached to the handle and the male end. The handle exerts a pulling action on the rod, forcing the male end to slide into the female end. This piece of pipe has a slot, allowing the bar and shaft to enter and slide along. This action moves the end bars of the two pieces (male and female) together, biting into the tires but stopping, when adjusted properly, when they contact the outside portion of the rims. This adjustment is achieved by a row of holes or apertures in the bar that is attached to the male piece. When the rod is moved into the appropriate hole, this adjustment can be achieved. When this is accomplished, the unit can then be locked by attaching a lock through the lock tab on the female piece and one of the corresponding holes in the male piece. The lock secures the two pieces together, not allowing them to be released. If in an attempted theft, the handle and rod unit are disassembled, the integrity of the unit is not compromised. The unit will not come apart until the lock is removed and the handle is moved to the open position. The ends of the end bars or rubberized clamp protrude into the open space of the rim and outside surface of the tire, making it difficult, if not impossible, to remove unless the unit is unlocked and opened.

An embodiment of this invention is constructed of a pipe with a slot cut into it, a piece of round stock that will slide into the pipe, a handle with two holes drilled into one end with a spacer to be added to it, a lock tab with a hole in it, a handle tab with a hole in it, a piece of flat stock with sequential holes drilled into it. (Flat stock must be of the correct thickness to fit into the slot of the pipe). Also, there must be two end bars or clamps (bent at appropriate angles for application), a piece of round stock called a rod (of correct length and bent at the appropriate angle) with a hole in both ends, two washers that fit the rod, two pins to go into the holes of the rod, a stud, a nylon insert nut. The configuration of the end bars or clamps must be structured so that the inside surface of each clamp tightly contacts both the outside surface of the tire and the outside surface of the rim.

DETAILED DESCRIPTION OF THE DRAWING AND PREFERRED EMBODIMENTS

Figure 1A:
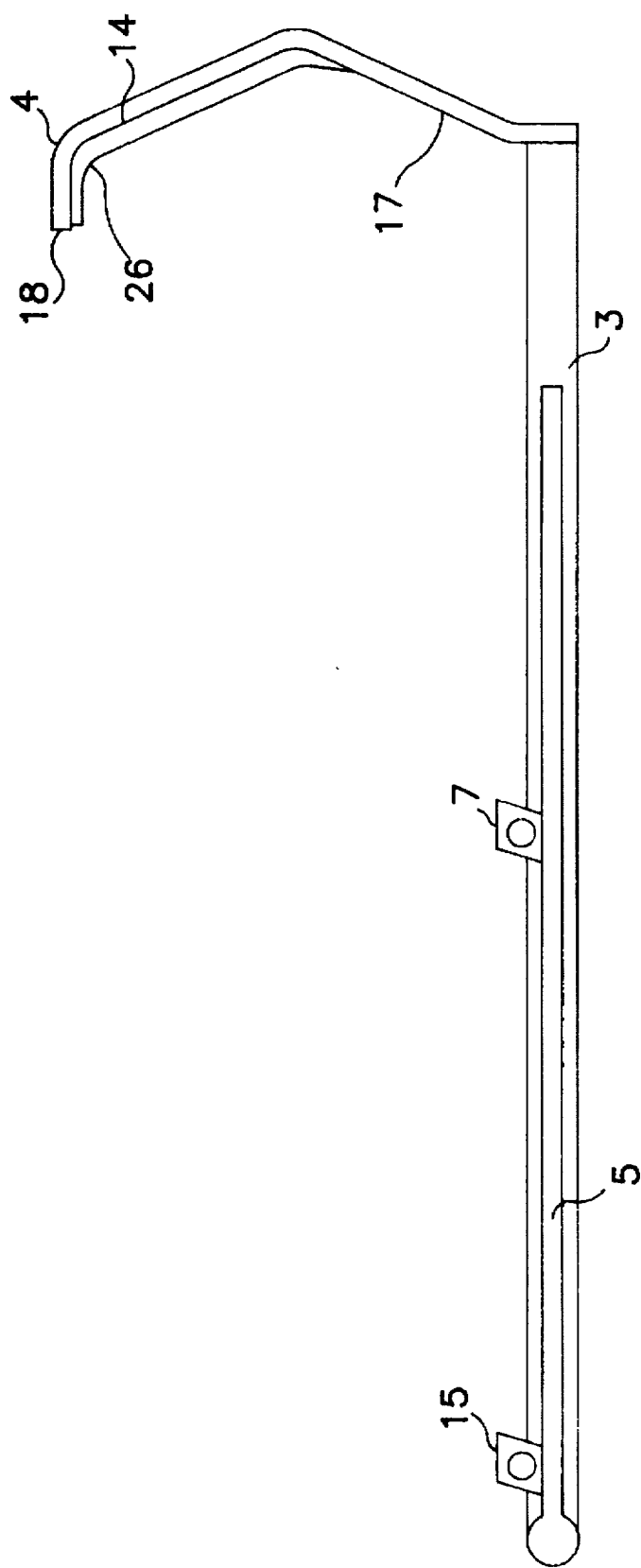
FIG. 1A is a perspective view of a disconnected grooved or slotted rod of the unassembled locking device of this invention.
Figure 1B:
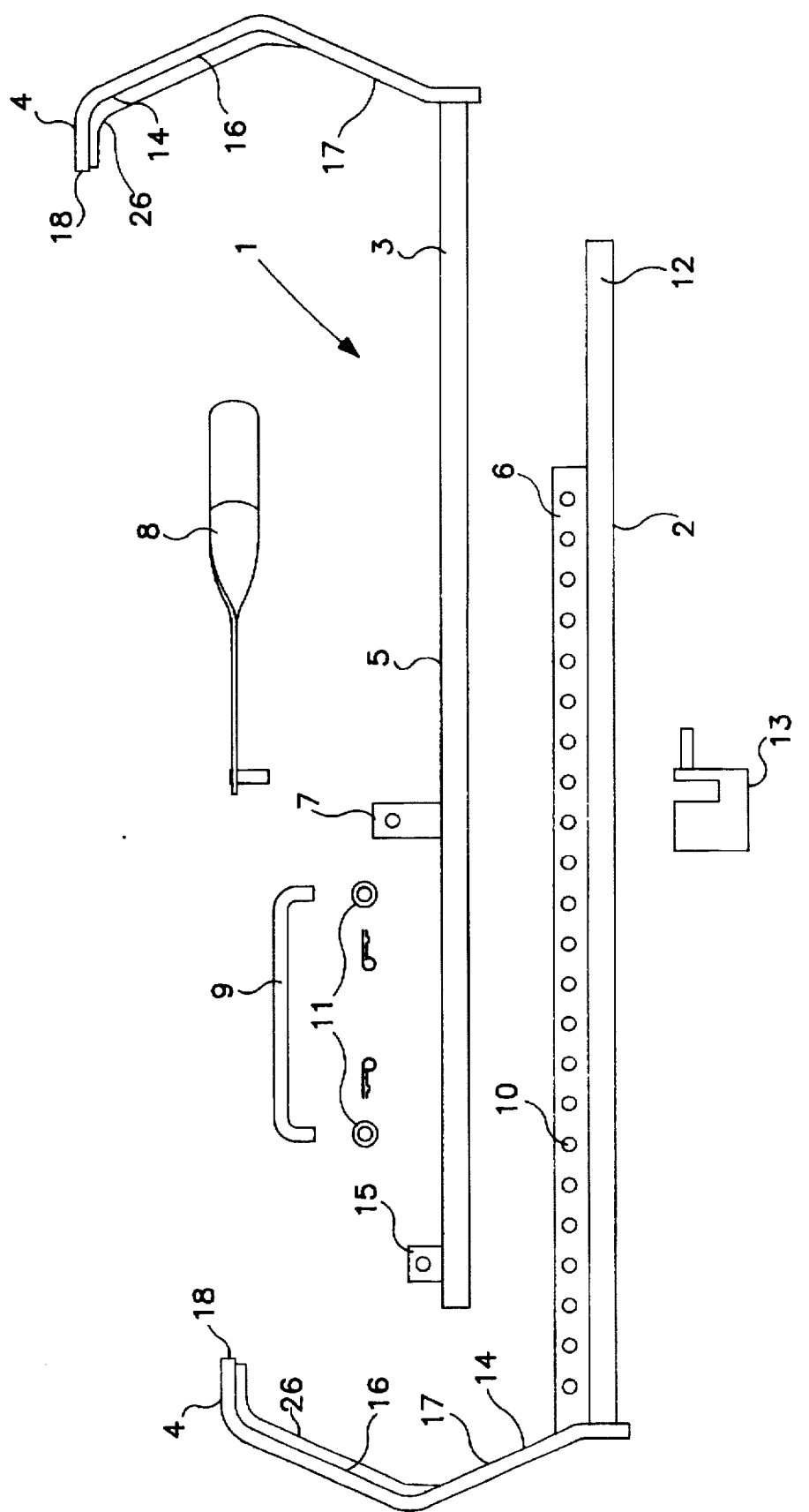
FIG. 1B is a plan view which illustrates the unassembled locking device of this invention with each separate component disconnected.
Figure 2:
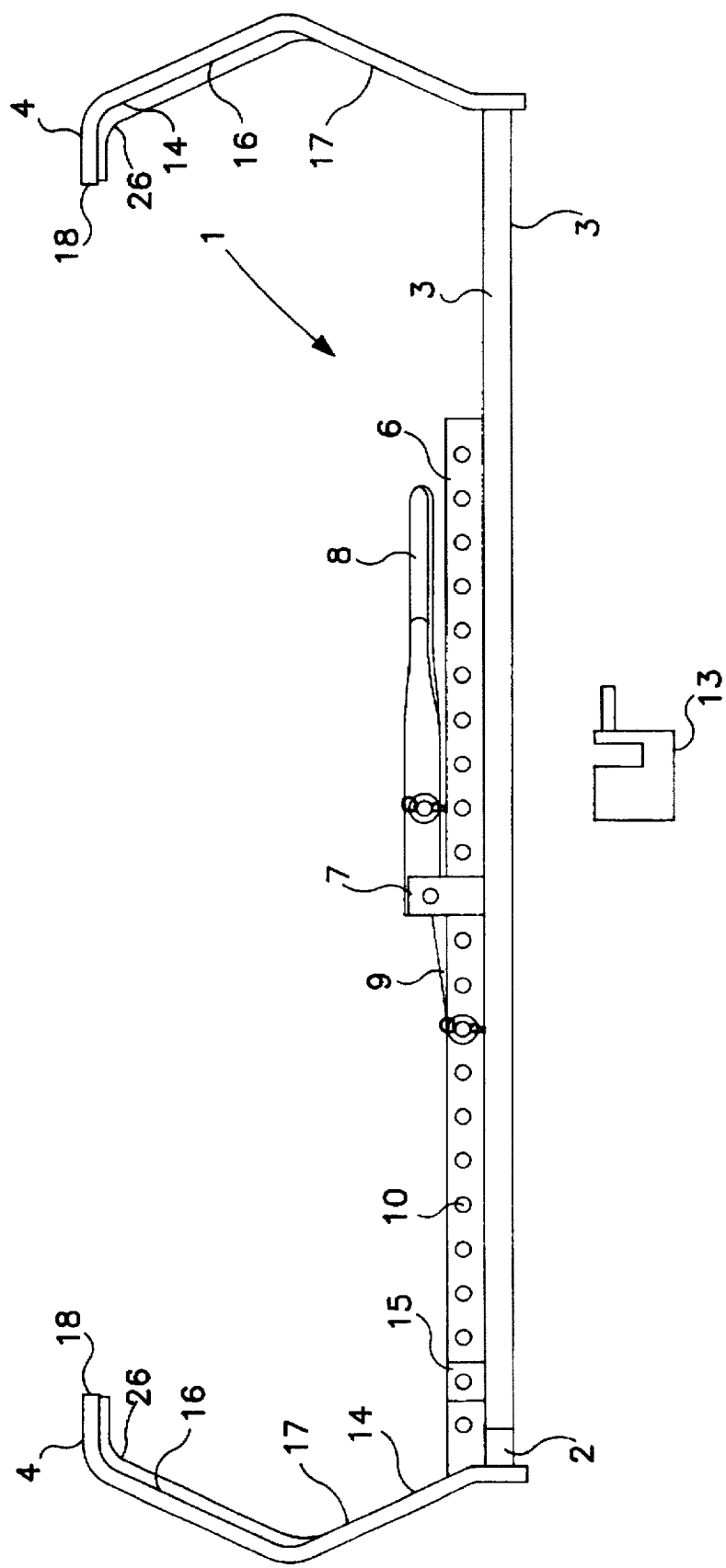
FIG. 2 is a plan view which illustrates the assembled locking device of this invention.

In FIG. 1B locking device 1 having two interconnecting rods 2 and 3 are shown, each having a rubberized clamp 4 on its terminal end portion. Rod 2 has apertures 10 along a substantial portion of its length to provide adjusting means for various size vehicles. Rod 3 has a groove 5 into which the apertured portion 6 of rod 2 will slidably fit. Rod 3 has an upwardly projecting slotted tab 7 onto which a movable handle is connected. A handle connector 9 extends when assembled from the handle 8 to an aperture in rod 2. The handle 8 makes it simple and effortless to lock the device 1 in place. Washers 11 provide easy movement to connector 9 when assembled. Rod 2 has a bottom slide bar 12 and an apertured portion 6 which slidably fits into and mates with groove 5 in rod 3. When slide bar 12 is pushed into rod 3 to the desired length, tightening lever handle is simply pushed down (as in FIG. 2) and rods 2 and 3 are fixed together. A padlock 13 is then fit into an aperture 10 and through tab 15 to permanently lock the device 1 in position. The clamps 4 have rubberized (or other non-skid) surfaces on their inner faces 14. These rubberized surfaces 26 are shown in FIGS. 1A, 1B and 2 but for clarity are not shown in the other figures. Apertured portion 6 of rod 2 is slid through the groove of grooved rod 3 until the desired dimension is reached. Then lock 13 is inserted through lock tab 15 and the aligned aperture in apertured rod 2 to lock rods 2 and 3 together.

In FIG. 2 the assembled locking device 1 is shown ready for use. Lever handle 8 is in downwardly locked position fixing rods 2 and 3 in place. Apertured tab 15 is used as the opening together with an aperture 10 through which lock 13 extends when locking rods 2 and 3 together via tab 15 and aperture 10. The configuration of clamps 4 must be structured so that rubberized surfaces 16 and 17 fit firmly against the outside surface of the vehicle's tires. Clamps end-hook portion 18 is bent just enough to clamp around the peripheral portion of rim 22, as shown in FIG. 4.

Figure 3:
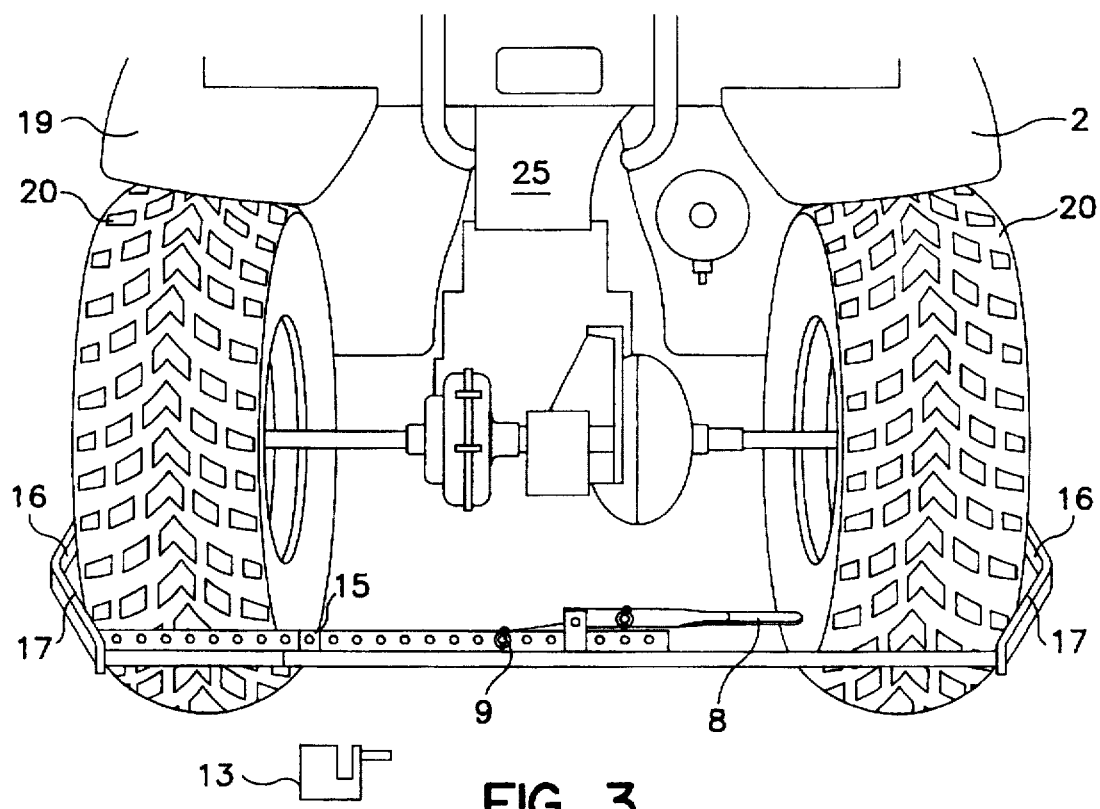
FIG. 3 is a perspective rear view of an ATV with the locking device of this invention in place.

In FIG. 3 a vehicle 19 is shown from the rear with the locking device 1 of this invention attached to its rear wheels 20. As wheels 20 rotate forward, the rods 2 and 3 will move upwardly and will strike surface 25 and stop. The vehicle rear surface 25 will prevent further movement of tires 20 because the device 1 (rods 2 & 3) will be forced against surface 25 and will be prevented from any further movement as shown in FIG. 4.

Figure 4:
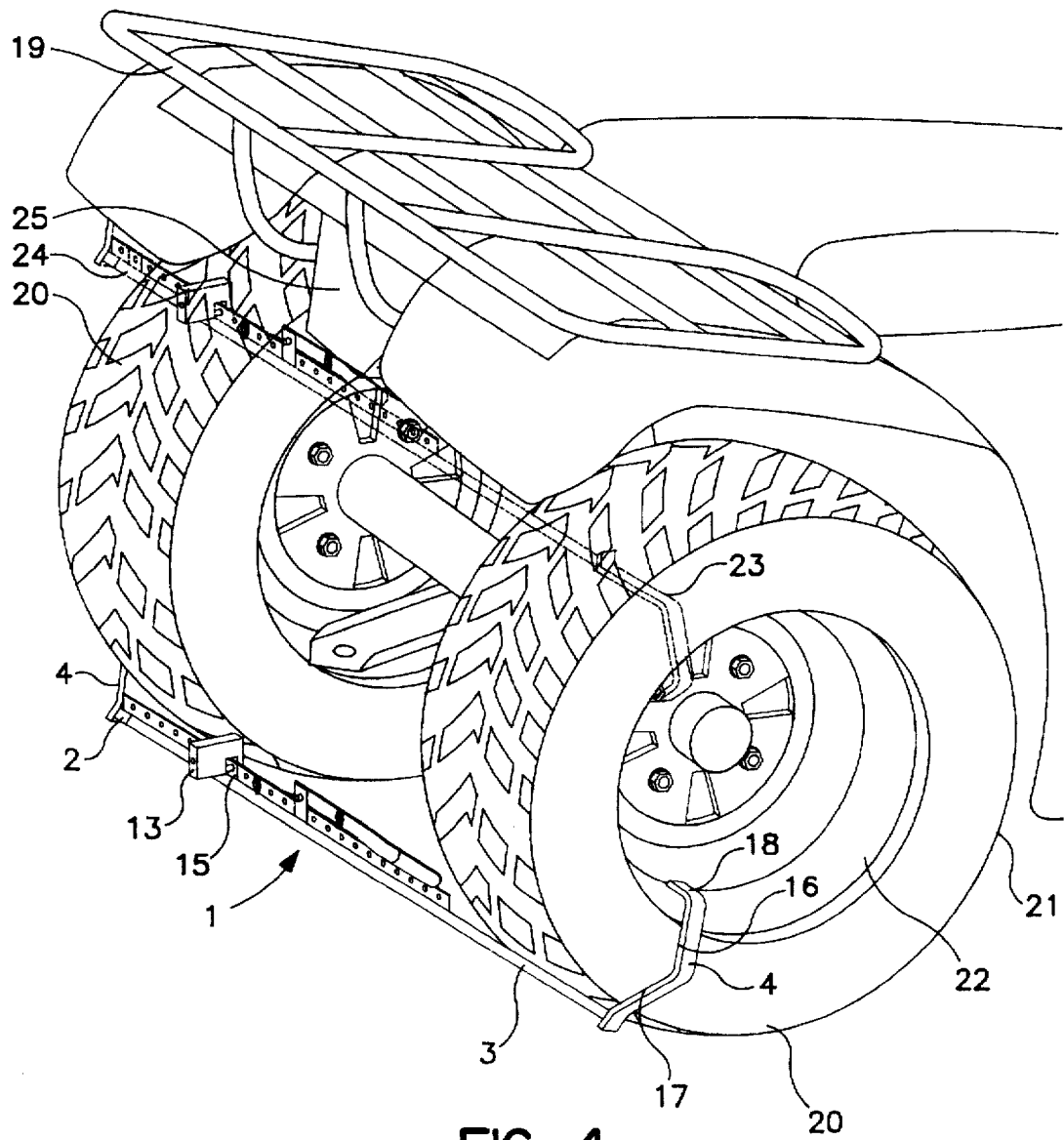
FIG. 4 is a perspective side view of an ATV with the locking device of this invention in place.

FIG. 4 shows a side perspective view as the device 1 is locked into wheels 20 at outside wheel surface 21 and rim periphery 22. As the wheels 20 move forward, the device 1 will move upwardly until it hits and stops at vehicle position 25 or any other stationary vehicle part as is shown by dotted lines 23–24.

Figure 5:
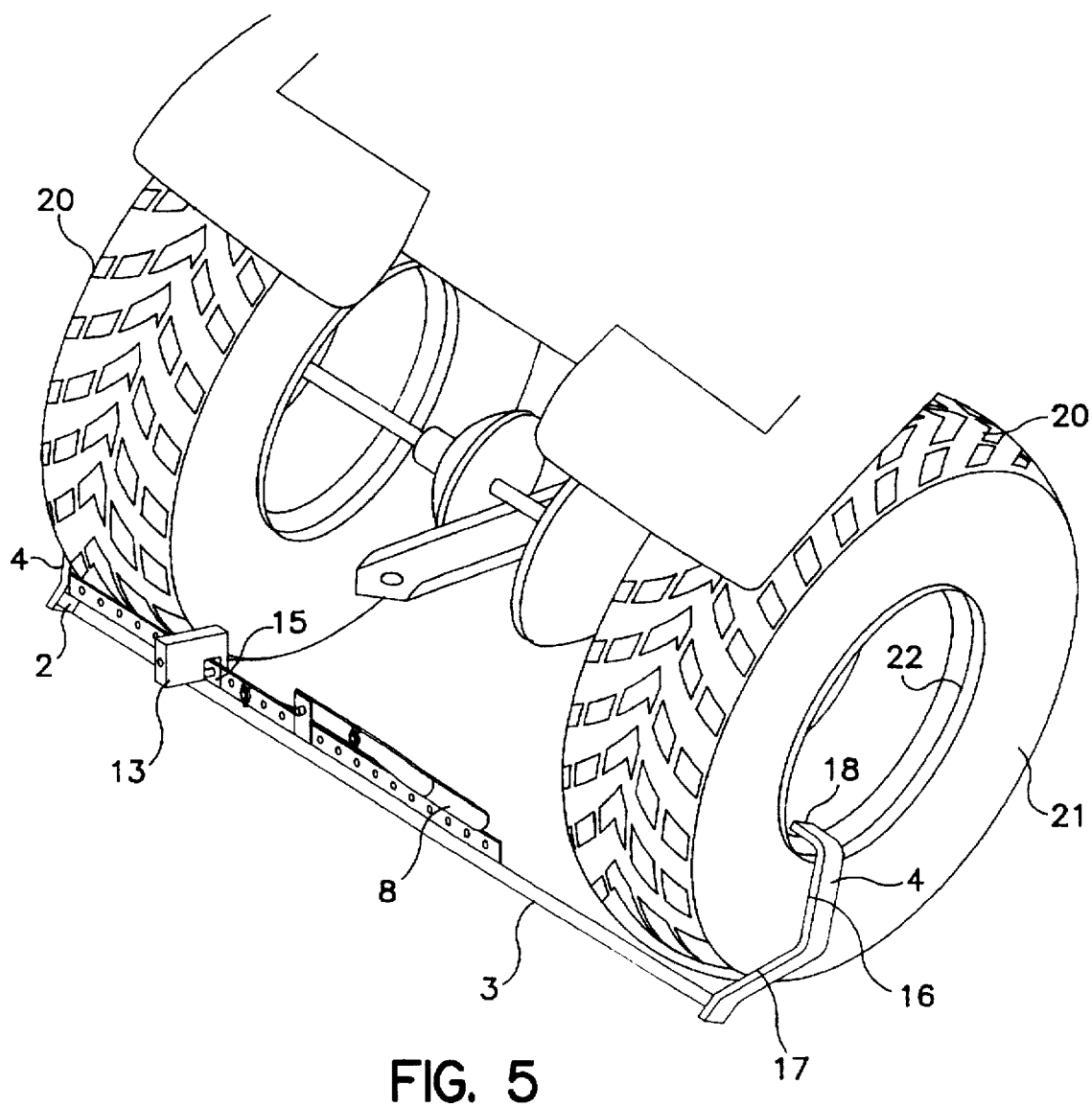
FIG. 5 is a close up side perspective view of the universal locking means of this invention placed on the rear wheels of a vehicle.

In FIG. 5 a close up view of the attachment of locking device 1 to the rear wheels 20 (could also be locked onto front wheels if desired) of a vehicle is shown. Notice that rubberized surfaces 16 and 17 fit tightly against the outer surface 21 of the tire 20, while clamp hook end 18 fits snugly against the peripheral portion 22 of the rim. In this manner, there are three lock points, i.e., tire lock point at surface 16, tire lock point at surface 17 and rim lock point at surface 18 of the clamps 4.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A universal vehicle locking device comprising two interfitting mating rods, two clamps and a locking structure, said rods having means to movably fit together and means to extend outwardly to fit from wheel to wheel in a plurality of sizes of vehicles, said rods each having clamps on their terminal outer portion, a first of said rods having a series of apertures therein that will cooperate with the other rod to fix and lock each to the other, said clamps having inner surfaces that will permit only clamp contact with tires on both sides of said vehicle on an outside portion of said tires and an external portion of a wheel rim, said clamps adapted to extend into said wheel rim on only an outside portion of said rim, said locking structure comprising an apertured tab located on a second of said two interfitting rods and a lock which fits through said apertured tab and one aperture of said series of apertures to lock each of said rods to the other.

2. The locking device of claim 1 wherein said inner surfaces are rubberized to enhance adherence to an abutting surface.

3. The locking device of claim 1 wherein said mating rods have locking means to lock said rods together, said locking means comprising apertures in said first rod, an apertured tab in a second rod, and a padlock having means to fit through said apertures and said apertured tab.

4. The locking device of claim 1 wherein one of said rods has apertures therein to allow for adjustment to fit each specific vehicle.

5. The locking device of claim 1 wherein said clamps have means to lock onto wheels with or without open rims.

6. The locking means of claim 1 wherein said clamps have means to fit only on one external side of the wheel and extend only to a peripheral portion on said rim.

7. The locking means of claim 1 wherein a lever handle is provided on at least one of said rods for easy securing of said rods to each other, and wherein said lever handle has means when in a downward locked position which causes said clamps to exert pressure against said tire and said rim.

* * * * *